Patented June 2, 1936

2,042,635

UNITED STATES PATENT OFFICE 2,042,635

POROUS METAL BODY AND PROCESS FOR MAKING IT

Eugene L. Schellens, Ridgewood, N. J., assignor to The Shellwood-Johnson Company, Paterson, N. J., a corporation of New Jersey Application September 17, 1932, Serial No. 633,694

4 Claims. (Cl. 75—135)

This invention relates to and has for its object a novel porous metal body and a process for making such body.

The porous metal body that comprises the present invention consists of metal particles, the surfaces of which are coated with or have adherent thereon films of a lower melting point metal which, when fluid, is capable of wetting the surfaces of the metal particles, the metal films on the particles at their regions of proximity or contact being integral so as to bond together the metal particles, the voids between the metal particles being substantially empty so that the mass is porous.

Figure 1:
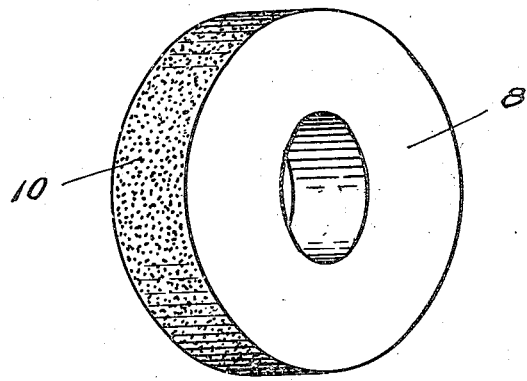
Fig. 1 is a perspective view of a porous metal body embodying the present invention, the particular body shown being an abrasive or cutting wheel.
Figure 2:
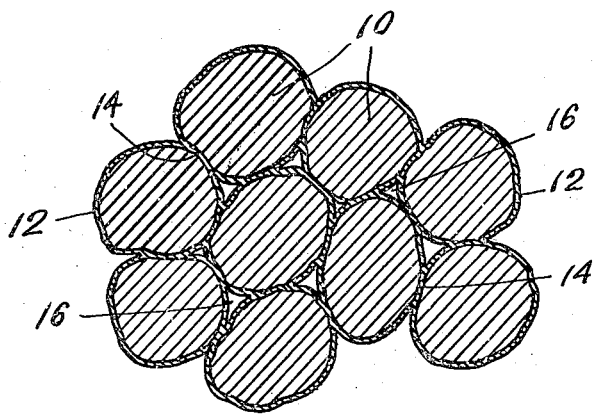
Fig. 2 is a greatly enlarged sectional detail of the metal body.

As shown in Fig. 2, the metal body 8 of Fig. 1 comprises a mass of metal particles 10 having on their surfaces films 12 of a lower melting point metal that, when fluid, can wet the surfaces of the metal particles 10 and also preferably can alloy therewith. The surface films 12 at their points of contact with each other 14, or at the regions of proximity of the metal particles 10, are fused together so that the metal particles are bonded together in a rigid mass. The voids 16 between the metal particles 10 are empty so that the metal body is porous. The metal particles 10 can be of a size dependent upon the uses to which the body is intended to be put but preferably are of small size or are granular, and for many purposes can be in powder form. The nature of the metal also depends upon the uses to which the metal body is intended to be put. When the metal body is used as a cutting tool the material can be a steel. For other purposes, iron or another metal can be employed. A mixture of particles of different metals can be employed. The film forming and bonding metal can depend upon the nature of the metal particles, its main characteristic being its ability to wet the surfaces of the metal particles and to spread thereover when fluid and to have a lower melting point than that of the metal particles. For iron and steel or the various alloys thereof copper is quite satisfactory as the film forming metal. In general any combination of high and low melting point metals can be employed which have an affinity for each other and wherein the low melting point metal is immune to the hydrogen or other furnace atmosphere that cleans and protects the surface of the high melting point metal during the bonding process.

The process of manufacture of the metal body embodying the present invention is essentially the same for every type of metal body although the process can advantageously be modified for the manufacture of certain types of metal bodies. The essential procedure in the manufacture of the metal body comprises the first step of forming an intimate mixture of the metal particles and particles of the film forming metal, the amount of the film forming particles being sufficient only to cover the surfaces of the metal particles and to bond them together but not sufficient to fill the voids between the metal particles in the completed object. Where the metal particles consist of iron and the film forming particles are copper, both particles being in powder form, an amount of copper particles equal to about 5% in weight of the amount of iron particles is satisfactory to bond together the iron particles without filling the voids between the iron particles. The degree of fineness of the particles determines to some extent the relative amounts of the two metals that should be employed. The essential requirement is that there shall be sufficient film forming or bonding metal to bond together the metal particles sufficiently strongly for the intended uses of the body and that there shall not be sufficient bonding metal to fill the voids between the metal particles in the completed product in any deleterious manner as it is an object of this invention to maintain voids between the metal particles, although, so far as the process of manufacturing the metal body is concerned it can, with modifications, be used to produce a body wherein the voids are filled. The strength of the bond can be varied by varying the ratio between the infusible and fusible metals. Iron, for instance, has the ability to absorb or to take into solution a certain amount, about 4%, of copper. Hence, if a lesser percentage of copper is used, the iron will be unsaturated and the bond between the iron particles will be less than if more copper is used.

The thorough mixture of the metal particles and film forming particles which now will be referred to as iron and copper particles, for brevity, is then heated in a reducing atmosphere such as hydrogen and the like at least up to and preferably somewhat higher than the melting point of the copper particles but below the melting point of the iron particles or, say, to a temperature of 2100° F. The copper particles consequently fuse and the fluid copper spreads over the surfaces of the iron particles and forms films thereon which are continuous between the immediately adjacent iron particles, as indicated at 14. The fluid copper, by preference, attaches itself to the surfaces of the iron particles between and at the regions of contact of the particles, rather than collecting in and filling the voids between the iron particles except when an excessive amount of copper is employed. The mass is then cooled, preferably while maintaining it in the reducing atmosphere, down to a temperature below the melting point of the copper so that the fluid copper films freeze or solidify and thus bond together the iron particles. The fusing of the copper can readily be done in an electric furnace supplied with a reducing atmosphere, the atmosphere being present in the furnace at a pressure slightly above the atmosphere and allowed to flow through and out of the furnace so as to make certain that atmospheric air will not enter the furnace during the fusing process. It is not necessary to take especial pains in providing metals that are free from oxides or surface impurities as the reducing atmosphere penetrates the porous mass and cleans the metals so that the copper can wet the surfaces and flow thereover and bond and alloy therewith.

The above is essentially the basic process employed in the manufacture of the porous metal body that constitutes a feature of the present invention. The process can be modified advantageously, however, for the production of bodies adapted for certain uses. Where the body is adapted to have some specific configuration the loose particles can be placed in a die that has the desired configuration and the fusing and solidifying operations can be carried out in the metal die, the main requisites of the die being that it shall not fuse at the heat of the furnace and that the fluid copper shall not wet the surface of the die or adhere thereto in any deleterious manner that will render it difficult to remove the finished body from the die. Where the metal particles are iron and the film forming particles are copper the die, or the surface thereof that is in contact with the particles, can be made of a stainless steel or of a suitable one of the various refractory materials. A gear can be made in this manner, for instance, and the powder receiving recess of the die can be arranged to form the gear teeth and the other desirable features of the gear. In the manufacture of intricately shaped bodies it may be desirable to tamp or press the powder in the die under some pressure sufficient to cause the powder mass to conform to the intricate configuration or shape of the die. The pressure can be mantained on the powder mass until the film forming particles have fused and the films have solidified. As a further modification, if it is desired to make a metal body wherein the pores are completely filled with the film forming material a sufficiently large amount of the particles of the film forming material may be mixed with the metal particles and heated as above described, preferably, although not always necessarily, while subjecting the powder mass to a sufficient pressure to compact the mass at the time the film forming particles are fluid so as to reduce the volume of the spaces between the metal particles.

While the above processes relate to the molding and shaping of the dry powder into the required configuration of the metal body, a large variety of different types of metal bodies adapted for different uses can be made by wet molding the powder and such wet molding is a further object of the invention. In the wet molding process the metal particles and the film forming particles, which will now be referred to again as iron and copper, respectively, for brevity, with a sufficient amount of copper particles being present to bond the iron particles but insufficient to fill the voids therebetween, are intimately mixed together as before but with a temporary and transitory binder. A temporary binder consisting essentially of a solution of suitable viscosity of pyroxylin in a solvent therefor is quite satisfactory. Any suitable binder, however, that will permit the copper and iron particles to be shaped in a self-supporting mass that will remain in such shape during the copper fusing process and will disappear in the fusing process without harmfully hindering the spreading of the copper over the iron particles is satisfactory, however. The copper and iron particles are thoroughly intermixed with a sufficient amount of the pyroxylin binder to form a relatively stiff mass or paste that can be molded into the desired configuration and preferably is self-supporting, although for some purposes it can be supported by the surfaces of a suitable die until the temporary binder becomes hard or, in the case of the pyroxylin binder, until the solvent has evaporated therefrom. The mass is then sufficiently bonded together by the temporary binder to be self-supporting without the aid of dies or other supporting forms. The mass is then placed in the hydrogen furnace and heated as before. The copper particles melt and spread over the surfaces of the iron particles but without causing the mass to lose its shape so that when the temperature of the mass is reduced below the freezing point of the copper the iron particles will bond together in the shape in which the mass was originally placed in the furnace. The body made from this process also is porous.

The porous body made by any of the processes above described is susceptible to a wide variety of uses. The porous body can be used for chemical and physical purposes for the diffusion and filtration of gases through the body and the like. When the body is made of proper materials the body can be used for catalysis, for instance, by reason of its porosity and hence its large area as compared with its superficial extent. In this case the film forming and bonding metal can be such as will act as a catalyst for some specific chemical reaction or process. The porous metal body can be used as a bearing for rotating shafts and the like wherein the pores are adapted to retain a lubricant. The pores of the bearing can be filled with babbitt or other bearing metal, which can be run into the pores in melted condition and will be retained therein, or the pores can be filled with graphite. With such a construction the porous body supplies the necessary stiffness and strength while the softer material in the pores provides the necessary bearing qualities. The porous metal body can be used as the dies in which plastics such as bakelite, or metals such as zinc or aluminum are molded in which case the presence of the pores in the body permits the venting of the die from the vapors or fumes of the molding materials so that superior die castings can be made. Cheap punching and forming dies can be made by the process above outlined by making cheap wooden dies for forming the mass into the shape of the punching or forming die. The porous metal mass can be used for manufacture of cutting tools and particularly of abrasive wheels and implements, the pores at the surface of the cutting wheel temporarily receiving the abraded material and the metal cutting particles when worn breaking away from their surface bond with the adjacent particles so as to present new and unworn cutting particles to the material undergoing abrasion. An abrading wheel embodying the present invention can be made stronger than the usual abrading wheel and thus can be rotated at high peripheral cutting speeds. The ratio between the infusible and the bonding metals can be adjusted, in the manner heretofore explained, so that the worn infusible particles can drop off the abrasive tool and thereby present fresh unworn particles to the cutting surface of the tool. Metal alloys as tungsten carbide, known as "carboloy", tungsten steel and the like which have been found to be unusually satisfactory as cutting tools can also be used in a cutting wheel in accordance with this invention and can be superior to the usual carborundum and the like wheels hereinbefore employed. The elasticity of the copper bond between the metal particles is advantageous for many uses of the metal body especially where it is subjected to shocks as in gears and cutting implements. The porous metal body can also exist as a relatively thin layer on a supporting surface and as such is adapted for many uses as, for instance, a cutting belt or to provide a wear resisting surface for wire-drawing dies, internal combustion engine cylinders and pistons and the like.

The character of the metal particles and also of the film forming and bonding metal is determined by the uses to which a particular body is to be put. If the body is to be used as a cutting wheel the metal particles can consist of high carbon steel, "carboloy", or the like, and the bonding material can be copper. The wheel after being made into the desired shape can be heat treated to develop the character of the metal particles so that they will be best suited for the purpose intended. An abrasive wheel, for instance, made from a high carbon steel powder can subsequently be heat treated in the usual manner to temper the steel. When the metal body is shaped to form a forming die, for instance, a different character of steel powder can be employed and the mass can be subsequently tempered. For providing a wear resisting surface for internal combustion engine cylinders and pistons, for instance, the metal particles can consist of soft cast iron with copper as the bonding material. For certain purposes other metals than copper for the bonding material can be employed, depending upon the use to which the body is to be put. Cobalt, gold, nickel are among such other film forming metals.

I claim:

1. The method of making a porous metal body which consists in thoroughly intermixing discrete particles of a high melting point metal consisting essentially of iron with a lower melting point bonding metal consisting essentially of copper, mixing a non-metallic wet binder with said metals to produce a pasty mass, shaping the mass of the mixture to the desired shape of body without substantially reducing the size of the voids between the particles, heating the shaped mass at least to the melting point of the bonding metal in a reducing atmosphere which facilitates the spreading of the molten metal over and its adherence upon the surfaces of the high melting point metal particles thereby bridging the adjacent metal particles, but without filling the voids between particles, but keeping the temperature below that at which the high melting point particles cohere and also below the alloying temperature of the two metals, and thereafter cooling the mass at least to the freezing point of the bonding metal, whereby to bond together the high melting point metal particles; the amount of the bonding metal being substantially less than sufficient to fill the voids between the high melting point particles so that the voids in the cool metal body are substantially empty and are substantially their original size.

2. The method of making a porous metal body which consists in mixing together discrete particles of iron and copper having respectively high and low melting points, the copper being present in quantity sufficient only to form thin films on the iron particles and insufficient to fill the voids therebetween to a substantial extent, temporarily bonding the discrete particles together into a self-supporting mass of selected configuration by a temporary binding agent comprising a solution of pyroxylin in a volatile solvent, heating the temporarily bonded mass to at least the melting point of the copper in a reducing atmosphere to cause the melted copper to spread upon and to bridge over adjacent solid particles of the iron and also to cause the disappearance of the temporary binder from the mass, and cooling the mass to solidify the fluid copper in bonding relation with the iron particles, the cold bonded mass preserving substantially intact the original voids between the iron particles.

3. The method of making a porous metal body which consists in mixing together discrete particles of a ferrous metal and copper having respectively high and low melting points, the copper being present in quantity sufficient only to form thin films covering the ferrous metal particles and insufficient to fill the voids therebetween, temporarily bonding and shaping the discrete particles together into a self-supporting mass of selected configuration by a wet transitory binder comprising a substantially viscous binding agent, such as pyroxylin in solution, which permits the particles to be shaped in a self-supporting mass retaining its shape throughout the method but which disappears at the temperatures employed, heating the temporarily bonded mass to a temperature at least as high as the melting point of the copper but far below that of the ferrous metal, in a reducing atmosphere, to cause the copper to melt and spread upon and to bridge over adjacent solid particles of the ferrous metal and also to cause the disappearance of the temporary binder from the mass, and cooling the mass to solidify the fluid copper in bonding relation with the ferrous metal particles, the cold bonded mass preserving substantially intact the original voids between such ferrous metal particles, thus rendering porous the product.

4. A porous metal body composed predominantly of a high melting point first metal, as iron, with a small proportion of a low melting point bonding metal as copper, and comprising a shaped mass of discrete particles of the first metal, each of dense and non-porous character, and the mass thereof being bonded together by thin coating films of the bonding metal spread on the surface portions of the first metal particles, such films being mutually integral between the adjacent tangency points of the particles, and the voids between the film-covered and bonded particles being connected and sufficiently empty throughout the mass to afford substantial porosity of the body, and the porous bonded mass having essentially the characteristics of the first metal particles composing it.

EUGENE L. SCHELLENS.